United States Patent
Han et al.

(10) Patent No.: US 9,934,293 B2
(45) Date of Patent: Apr. 3, 2018

(54) GENERATING SEARCH RESULTS

(71) Applicant: Alibaba Group Holding Limited, George Town (KY)

(72) Inventors: Xiaomei Han, Hangzhou (CN); Chao Song, Hangzhou (CN); Hui Wei, Hangzhou (CN)

(73) Assignee: Alibaba Group Holding Limited (KY)

( * ) Notice: Subject to any disclaimer, the term of this patent is extended or adjusted under 35 U.S.C. 154(b) by 851 days.

(21) Appl. No.: 13/929,099

(22) Filed: Jun. 27, 2013

(65) Prior Publication Data

US 2014/0012840 A1   Jan. 9, 2014

(30) Foreign Application Priority Data

Jul. 5, 2012   (CN) .......................... 2012 1 0233248

(51) Int. Cl.
*G06F 17/30* (2006.01)

(52) U.S. Cl.
CPC .. *G06F 17/30554* (2013.01); *G06F 17/30696* (2013.01); *G06F 17/30707* (2013.01); *G06F 17/30864* (2013.01)

(58) Field of Classification Search
CPC ......... G06F 17/30554; G06F 17/30696; G06F 17/30707; G06F 17/30864; G06F 17/3053
See application file for complete search history.

(56) References Cited

U.S. PATENT DOCUMENTS

| | | | |
|---|---|---|---|
| 7,308,421 B2 | 12/2007 | Raghupathy et al. | |
| 7,349,868 B2 | 3/2008 | Tenorio | |
| 7,921,106 B2 | 4/2011 | Chen et al. | |
| 8,285,721 B2 | 10/2012 | Ruvini et al. | |
| 8,527,475 B1* | 9/2013 | Rammohan | G06F 17/30489 707/692 |
| 8,738,456 B2 | 5/2014 | Sembower | |
| 9,460,212 B2* | 10/2016 | Wu | G06F 17/30867 |
| 9,779,130 B2* | 10/2017 | Rosenburg | G06F 17/30395 |
| 2006/0195428 A1* | 8/2006 | Peckover | G06F 17/3064 |

(Continued)

FOREIGN PATENT DOCUMENTS

| | | |
|---|---|---|
| JP | 2003085395 | 3/2003 |
| WO | 2011105605 | 9/2011 |

OTHER PUBLICATIONS

Mikians et al., Detecting price and search discrimination on the Internet, Oct. 29, 2012, 6 pages.*
Dictionary of search terminology, Apr. 10, 2003, 23 pages.*

*Primary Examiner* — Noosha Arjomandi
(74) *Attorney, Agent, or Firm* — Van Pelt, Yi & James LLP

(57) ABSTRACT

Generating search results is disclosed, including: sorting a plurality of sets of web page information into one or more groups based on vendors associated with respective ones of the plurality of sets of web page information; for a group of sets of web page information associated with a vendor, determining a value included in the group of sets of web page information as an attribute value of a first attribute associated with the vendor; and determining whether a set of web page information of the group of sets of web page information associated with the vendor is to be included in search results based at least in part on whether a search query corresponds to the attribute value of the first attribute associated with the vendor.

17 Claims, 5 Drawing Sheets

(56) References Cited

U.S. PATENT DOCUMENTS

| | | | |
|---|---|---|---|
| 2007/0150365 A1* | 6/2007 | Bolivar | G06Q 30/02 705/26.61 |
| 2008/0120129 A1* | 5/2008 | Seubert | G06Q 10/06 705/35 |
| 2008/0133380 A1 | 6/2008 | Tenorio | |
| 2008/0189296 A1* | 8/2008 | Cloutier | G06Q 10/06 |
| 2009/0171955 A1* | 7/2009 | Merz | G06F 17/30985 |
| 2009/0254971 A1* | 10/2009 | Herz | G06Q 10/10 726/1 |
| 2010/0211445 A1* | 8/2010 | Bodington | G06Q 30/02 705/14.17 |
| 2011/0145227 A1 | 6/2011 | Kenthapadi et al. | |
| 2011/0178849 A1* | 7/2011 | Rane | G06Q 30/0202 705/7.31 |
| 2012/0030006 A1* | 2/2012 | Yoder | G06Q 30/0201 705/14.41 |
| 2012/0143883 A1 | 6/2012 | Chen et al. | |
| 2012/0259882 A1* | 10/2012 | Thakur | G06F 17/30873 707/767 |
| 2012/0310780 A1* | 12/2012 | Tenorio | G06Q 30/0204 705/26.62 |
| 2013/0060755 A1* | 3/2013 | He | G06Q 30/02 707/722 |
| 2013/0204886 A1* | 8/2013 | Faith | G06Q 30/0631 707/756 |
| 2013/0275269 A1* | 10/2013 | Chen | G06Q 30/0625 705/26.62 |
| 2014/0101146 A1* | 4/2014 | Scriffignano | G06F 17/3053 707/728 |
| 2014/0114962 A1* | 4/2014 | Rosenburg | G06Q 10/063 707/723 |
| 2015/0169624 A1* | 6/2015 | Gupta | G06F 17/30864 707/639 |
| 2016/0019613 A1* | 1/2016 | Roof | G06Q 30/0609 705/26.35 |
| 2016/0210673 A1* | 7/2016 | Maddali | G06Q 30/0282 |
| 2017/0186065 A1* | 6/2017 | Zhu | G06Q 30/0621 |

* cited by examiner

GENERATING SEARCH RESULTS

CROSS REFERENCE TO OTHER APPLICATIONS

This application claims priority to People's Republic of China Patent Application No. 201210233248.3 entitled A METHOD AND DEVICE FOR GENERATING SEARCH RESULTS, filed Jul. 5, 2012 which is incorporated herein by reference for all purposes.

FIELD OF THE INVENTION

The present application relates to network communication technology. In particular, the present application relates to generating search results.

BACKGROUND OF THE INVENTION

Typically, when a user conducts a search by entering search keywords at a search web page, the search engine matches the search keywords to documents stored in a documents database. Documents that are textually or semantically similar to the search keywords are ranked according to corresponding historical click rates, for example. Documents that are ranked higher among the search results are sent back to the user. For example, a document may comprise a web page or an advertisement.

A problem with such conventional searches is that during searches, often, keywords included in the documents are used to match against the search keywords, and some documents may include misleading keywords that are intended to increase the exposure of the documents but that may deceive users. For example, a merchant's main products are pianos but in order to draw more people to view the merchant's web page where the merchant sells pianos, the merchant gives the web page a title that is related to a popular mobile phone. When users who have searched for the popular mobile phone click on the link corresponding to the merchant, they find web page information related to pianos, which is not what the users had intended to search for. Thus, the users' time is wasted and also the users may need to perform additional searches to find the products or information they were actually looking for. These repeated searches add additional strain on the server.

BRIEF DESCRIPTION OF THE DRAWINGS

Various embodiments of the invention are disclosed in the following detailed description and the accompanying drawings.

DETAILED DESCRIPTION

Figure 1:
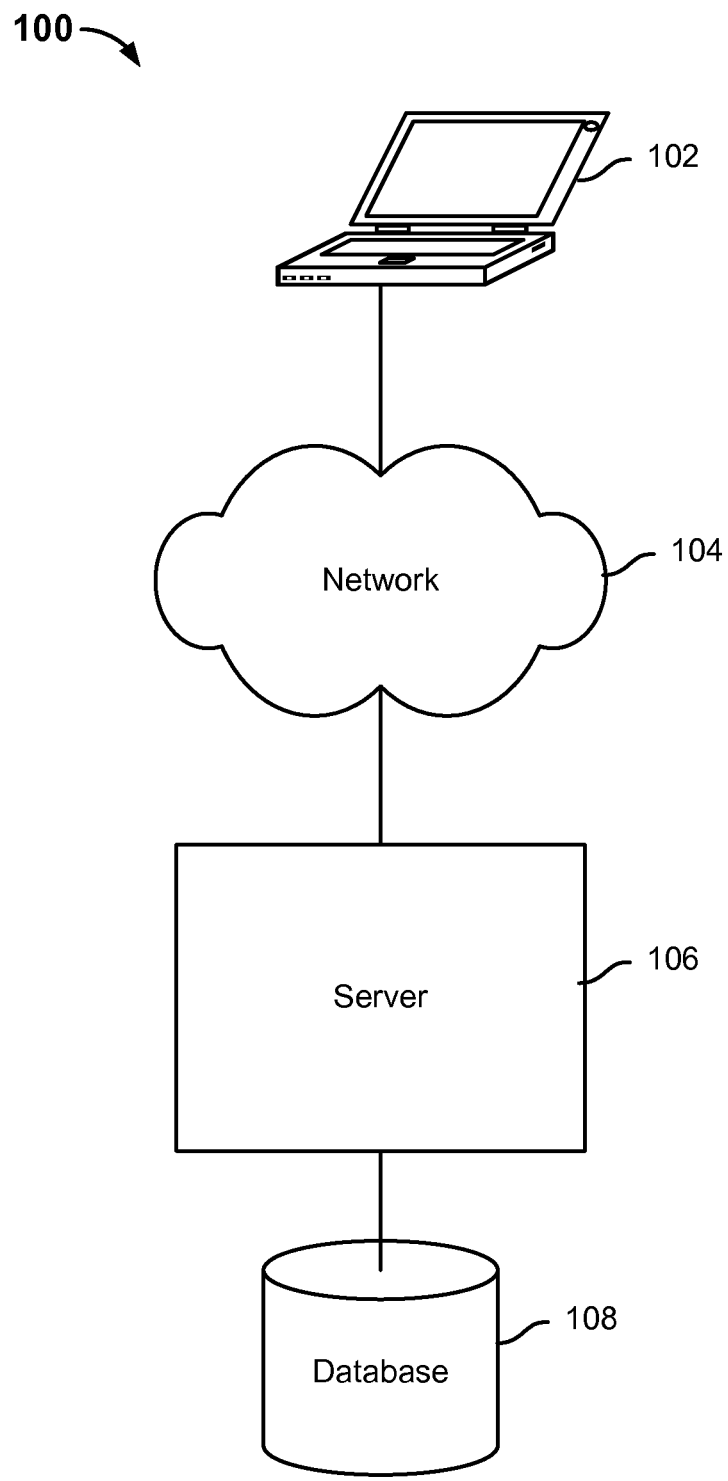
FIG. 1 is a diagram showing an embodiment of a system for generating search results.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided is below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of generating search results are described herein. A search query including one or more search keywords is received from a user. In various embodiments, the search query is matched against a database of sets of web page information. In various embodiments, a set of web page information represents the content and/or metadata associated with a particular web page or advertisement. A set of web page information may include attributes associated with a vendor and one or more products sold by the vendor. The sets of web page information are sorted by associated vendor (e.g., the vendor that submitted each of the set of web page information in the group) and for each group of web page information associated with a particular vendor, a first field value is extracted from the set(s) of web page information in the group and used as the attribute value for a first attribute associated with the vendor and also each of the set(s) of web page information in the group associated with the vendor. In some embodiments, the first attribute is the main product attribute and is presumed to accurately represent the primary type(s) of products sold by the vendor. In some embodiments, the value is a core product word in the sets of web page information of the vendor group. In some embodiments, the search keywords are compared to the values of the first attributes corresponding to sets of web page information and those whose values of the first attribute matches the search keywords are included in search results to be returned to the user.

FIG. 1 is a diagram showing an embodiment of a system for generating search results. In the example, system 100 includes client device 102, network 104, server 106, and database 108.

Client device 102 is configured to communicate with server 106 over network 104. While client device 102 is shown to be a laptop computer, other examples of client device 102 includes a desktop computer, a mobile device, a tablet device, a smart phone, and/or any other computing device. Client device 102 includes an input interface (e.g., a physical keyboard or touchscreen) through which a user may input characters and also a display interface at which information may be displayed for the user. In various embodiments, a user may use a web browser application executing at client device 102 to input a search query into a search page. The search query is sent from client device 102 to server 106. Server 106 is configured to return search results to client device 102. In some embodiments, at least some of the search results returned from server 106 are sets of web page information. A set of web page information may be associated with a web page (associated with selling one or more products) or an advertisement.

Sets of web page information are stored in database 108. Each set of web page information is submitted by a vendor of one or more products. Therefore, the contents of the web page information (e.g., product words, associated industries, product attributes, category, vendor information, etc.) are determined by the associated vendor. Due to the submission by vendors of sets of web page information, sometimes a set of web page information may include information related to a product or an industry that is not the primary types of products or the primary industry associated with the vendor. In some embodiments, database 108 also stores historical data associated with previously received search queries and previously selected sets of information among search results, for example.

Server 106 is configured to sort the sets of web page information stored at database 108 into groups based on vendors. Put another way, sets of web page information associated with the same vendor are sorted into the same group. Server 106 is configured to determine at least a first attribute value associated with a vendor based on values extracted from the sets of web page information associated with the group associated with the vendor. In various embodiments, the first attribute comprises a main product attribute, which represents the one or more primary products offered by the vendor. In various embodiments, server 106 is configured to determine whether a set of web page information is to be included in search results based on whether the first attribute value associated with the vendor associated with the set of web page information corresponds to a search keyword included in the search query. In the event that the first attribute value corresponds to at least a search keyword, then the set of web page information is included in the search results. For example, if the first attribute were the main product attribute, then only sets of web page information associated with vendors whose main products are relevant to the search query are included in search results.

Figure 2:
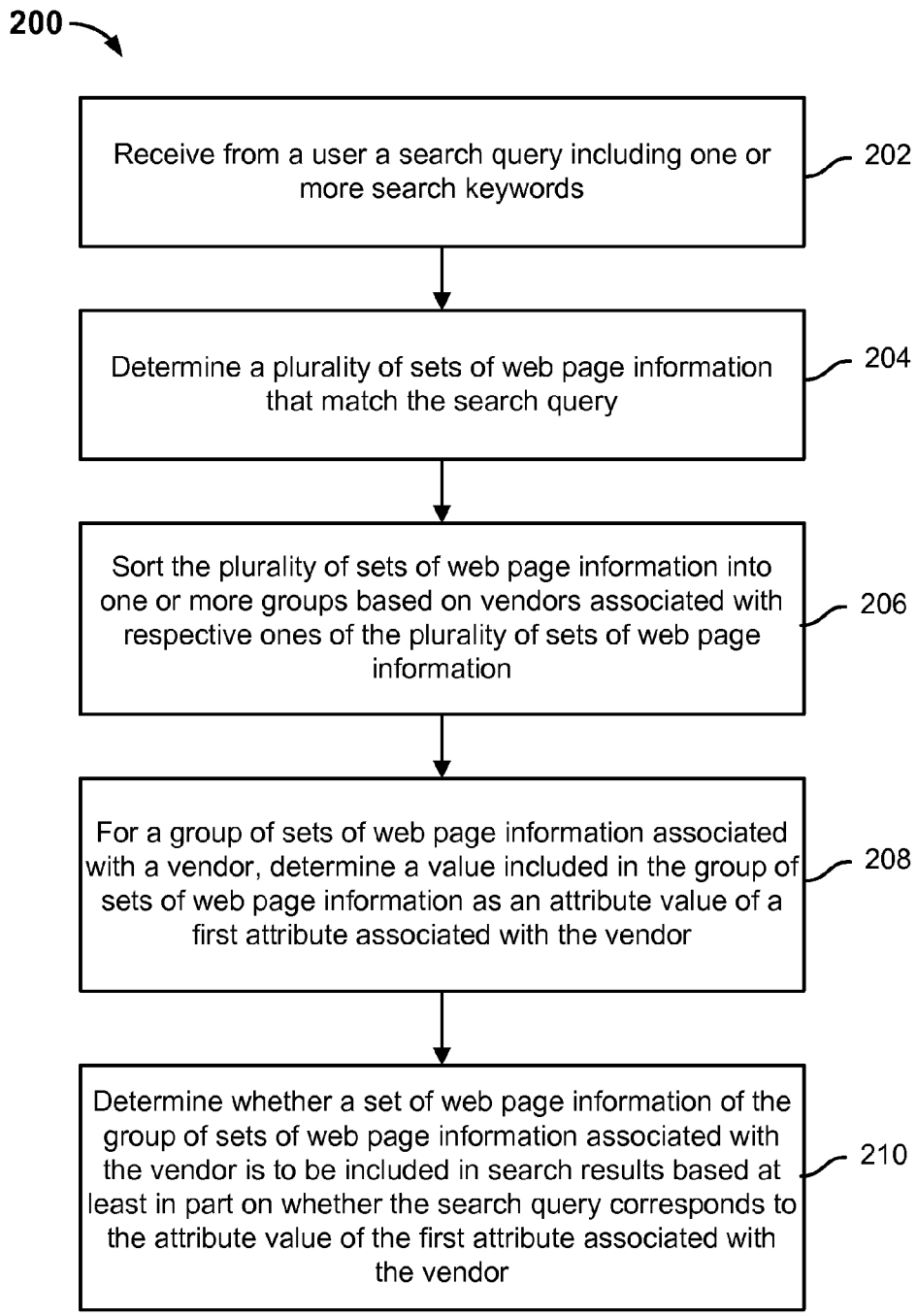
FIG. 2 is a flow diagram showing an embodiment of a process for generating search results.

FIG. 2 is a flow diagram showing an embodiment of a process for generating search results. In some embodiments, process 200 is implemented at system 100 of FIG. 1.

At 202, a search query including one or more search keywords is received from a user. For example, the search query may be input by a user into a search engine at a webpage.

At 204, a plurality of sets of web page information that match the search query is determined. In some embodiments, the search query is compared against the sets of web page information stored at a web page information database and preliminary matching sets of web page information are determined. A set of web page information is submitted by a particular vendor and therefore includes content and/or metadata provided by that vendor. In some embodiments, the content and/or metadata of a set of web page information are stored in various fields. For example, a matching set of web page information is a set of web page information that includes at least a keyword that matches or is similar to at least a keyword of the search query. However, the preliminary matching sets of web page information are not directly returned as search results to the user. As will be described below, at least a subset of the preliminary matching sets of web page information is selected to be returned as search results to the user.

At 206, the plurality of sets of web page information is sorted into one or more groups based on vendors associated with respective ones of the plurality of sets of web page information. The preliminary matching sets of web page information are sorted into various groups, where sets of web page information in the same group are associated with the same vendor. Put another way, the sets of web page information that are submitted by the same vendor are sorted into the same group.

In some embodiments, rather than sorting the preliminary matching sets of web page information in response to a query, all the sets of web page information stored in the database is sorted into groups based on associated vendors ahead of processing queries.

At 208, for a group of sets of web page information associated with a vendor, a value included in the group of sets of web page information is determined as an attribute value of a first attribute associated with the vendor. In some embodiments, for each of the groups of sets of web page information, a particular field value is assigned to the first attribute to be associated with the vendor associated with the group. In various embodiments, the first attribute associated with a vendor is the main product attribute. In some embodiments, a set of web page information includes at least one or more of the following fields: product words, associated industries, a category, product attributes, a publisher, and vendor information (e.g., vendor address, vendor name, and other such information).

A first designated field value of each of the sets of web page information of the group is extracted. For example, the first designated field is the product words field of a set of web page information. The main product attribute associated with the vendor is used to describe the types of products or specific products that the vendor associated with the group of sets of web page information primarily sells. In some embodiments, the values of the main product attribute include core product words extracted from the product words fields of the sets of web page information associated with the vendor. For example, the values of the product words fields of the sets of web page information associated with the vendor are extracted and the unique, core product words may be extracted from those values. In various embodiments, a core product word is a word or phrase (typically a noun) that represents a type of product. For example, to obtain the core product words from the extracted values, a general part-of-speech tagging tool may be used to obtain the parts of speech (noun, verb, adjective, etc.) of each extracted product words field value. The set of one or more (unique) nouns extracted from the extracted product words field values become the core product words. Also, for example, a dictionary of phrases that are not necessarily just nouns and that constitute core product words may also be used to extract the core product words from the extracted product words field values. For example, if "Samsung" and "brand" are not included in a core product words dictionary but "tablets" is, then the core product words of the product words field value "Samsung brand tablets" is "tablets," which is used as the value of the main product attribute. In some embodiments, as will be described further below, a percentage of occurrence is determined for each set of core product words (a percentage of occurrence is the frequency that the set of core product words appear within all the sets of core product words determined for a vendor) and only those sets of core product words with corresponding percentages of occurrence that exceed a first preset threshold value are used as the attribute values of the main product attribute associated with the vendor. A main product attribute associated with a vendor is also associated with every set of web page information associated with the vendor.

In some embodiments, a second designated field value of each the sets of web page information of the group is extracted and to be used for a second attribute associated with the vendor. In various embodiments, the second attribute associated with the vendor is the main industry attribute. For example, the second designated field is the associated industries field of the sets of web page information. The main industry attribute may be used to describe the primary type(s) of industries with which the vendor associated with the sets of web page information are associated. One example of a "main industry" attribute value is "communications equipment." In some embodiments, as will be describer further below, a percentage of occurrence is determined for each extracted associated industries value and only those associated industries value with corresponding percentages of occurrence that exceed a second preset threshold value are used as the attribute values of the main industry attribute associated with the vendor. A main industry attribute associated with a vendor is also associated with every set of web page information associated with the vendor.

Various sets of web page information may be associated with the same product but each set of web page information may include slightly different field values (e.g., because the sets of web page information were submitted by their respective vendors who may specify different wordings for these field values). The following is a set of web page information including certain fields and their respective values:

Product words: Samsung tablets
Associated industry(ies): Communications equipment
Category: Consumer devices
Type: GSM
Color: red
Place of origin: Guangzhou
Vendor: User1, Alibaba Network Technology Co., Ltd.

For the example vendor listed above, User1, Alibaba Network Technology Co., Ltd., the following main product attribute values and main industry attribute values may be extracted based on the set of web page information listed above and other sets of web page information that are also associated with the vendor:

Main product: Mobile phones, MP3s, computers, telephones
Main industry: Communications equipment, business services.

Below is one example of selecting the values of the main product attribute and the main industry attribute for a particular vendor:

First, the sets of web page information (e.g., of the preliminary matching sets of web page information) associated with the vendor are found. Then all the values of the product words fields and the associated industry fields corresponding to the sets of web page information are extracted. For each product words field value (or set of core product words extracted therefrom) and each associated industry field value, a percentage of occurrences among of the sets of web page information is determined. Then those product words field values (or set of core product words extracted therefrom) whose percentage of occurrences exceed a first preset threshold value are selected as values of the main product attribute for the vendor and those associated industry values whose percentage of occurrences exceed a second preset threshold value are selected as values of the main industry attribute for the vendor. In some embodiments, the values selected for the main product attribute include core product words determined from values extracted from the product words fields of the sets of web page information associated with the vendor. For example, a first preset threshold value is 10%. Product word A appears 50 times among all the of web page information associated with a vendor. Product word B and product word C appear 30 and 2 times, respectively, among all the of web page information associated with the vendor. The percentage of occurrences of product word C is 2/(50+30+2)=2.4%, which is less than the first preset threshold value of 10%. Therefore, the product word C might is not selected as an attribute value corresponding to the main product attribute of the vendor. However, the percentage of occurrences of the each of product words A (50/(50+30+2)=61.0%) and B (30/(50+30+2)=36.6%) is greater than the first preset threshold value of 10%, and are therefore the core product words corresponding to the vendor and also selected as the values of the main product attribute value of the vendor.

At 210, whether a set of web page information of the group of sets of web page information associated with the vendor is to be included in search results is determined based at least in part on whether the search query corresponds to the attribute value of the first attribute (e.g., the main product attribute and/or the main industry attribute) associated with the vendor. Once the main product attribute value(s) and/or the main industry attribute value(s) have been selected for a vendor, whether a set of web page information associated with the vendor should be included in search results to potentially be returned to the user depends on whether the search keywords of the search query matches any of the main product attribute value(s) and/or the main industry attribute value(s). Because the main product attribute value(s) and/or the main industry attribute value(s) are presumed to accurately represent the types of products/industries associated with the vendor, other product words field values and associated industries field values that are less relevant to the primary types of products sold by the vendor but that may be included in the sets of web page information submitted by the vendor will not be used to match against the search query. Therefore, the significance of such less relevant product field values are attenuated with the use of the main product attribute and/or the main industry attribute.

In some embodiments, it may be determined whether the main product attribute value(s) and/or the main industry attribute value(s) correspond to at least some of the search keywords based on a similarity or exact match. For example, if the main product attribute value is "mobile phone" and the search keywords are also "mobile phone," then the two are an exact match. In some embodiments, the main product attribute value(s) and/or the main industry attribute value(s) may be determined to correspond with at least some of the search keywords based on a preset correspondence between two words. For example, if the main product attribute value is "mobile phone" and the search keyword is "Nokia," and if a preset correspondence between "mobile phone" and "Nokia" has been pre-established, then the two words are matched according to the preset correspondence.

In some embodiments, if a search keyword matches either one of the main product attribute value(s) or the main industry attribute value(s) of a vendor associated with a set of web page information, then the set of web page information is potentially included in search results to be returned to the user. However, if a search keyword matches neither one of the main product attribute value(s) nor the main industry attribute value(s) of a vendor associated with a set of web page information, then the set of web page information is excluded from search results to be returned to the user.

By using the assigned main product attribute value(s) and/or the main industry attribute value(s) associated with each vendor to determine search results, those sets of web page information whose main product attribute value(s) and/or the main industry attribute value(s) are not relevant to the search query are filtered out and excluded from the search results. If a vendor publishes false information in sets of web page information, then such web page information can be filtered out through determining that the main products and/or main industries associated with such web page information are not related to the products associated with the search query. In addition, since web page information whose main products or main industries that are irrelevant to the search query are eliminated from the search results, when search engine servers transmit search result data to the client that sent the search query, the volume of transmitted data is accordingly decreased. As a result, network transmission speeds will improve, and network congestion will be mitigated.

Figure 3:
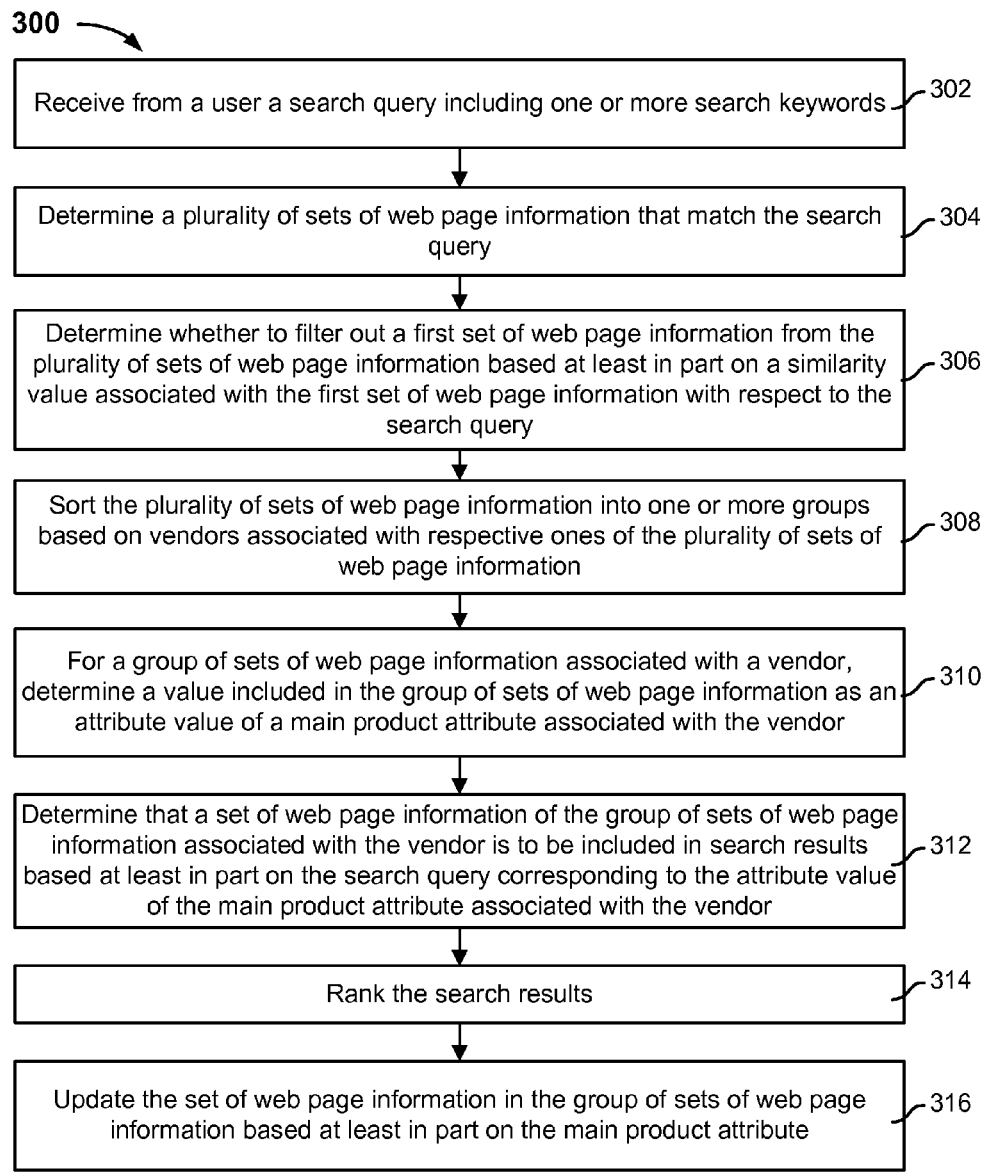
FIG. 3 is a flow diagram showing an embodiment of a process for generating search results.

FIG. 3 is a flow diagram showing an embodiment of a process for generating search results. In some embodiments, process 300 is implemented at system 100 of FIG. 1.

Process 300 is similar to process 200 but additionally includes filtering out of sets of web page information that are not sufficiently similar to the search query and ranking of search results of which at least a portion are to be returned to the user.

At 302, a search query including one or more search keywords is received from a user. For example, the search query may be input by a user into a search engine at a webpage.

At 304, a plurality of sets of web page information that match the search query is determined. In some embodiments, the search query is compared against the sets of web page information stored at a web page information database and preliminary matching sets of web page information are determined.

At 306, it is determined whether to filter out a first set of web page information from the plurality of sets of web page information based at least in part on a similarity value associated with the first set of web page information with respect to the search query. In some embodiments, 306 is optionally performed to filter out (i.e., exclude) those of the preliminary matching sets of web page information (or a database of all sets of web page information) that are not sufficiently similar to the search query from further processing. In some embodiments, to determine whether a set of web page information is sufficiently similar to the search query, a similarity value is determined for the set of web page information with respect to the search query and if the similarity value is less than a preset similarity threshold value, then the set of web page information is considered to be insufficiently similar to the search query and therefore filtered out. The similarity value between each set of web page information from the preliminary matching sets of web page information (or a database of all sets of web page information) and the search query may be determined by any appropriate technique.

The following is one example technique by which to determine the similarity value between a set of web page information and the search query:

One or more core product words associated with the search keywords of the search query are extracted. Because there are no strict rules by which users provide search keywords, the majority of search keywords in search queries are colloquial. Sometimes, a search query includes words associated with names of products that users wish to search for and also descriptive phrases in addition to the words associated with the names of products. Such descriptive phrases may be very diverse. For example, when a user wishes to purchase a mobile phone that is suited to be used by an elderly person, he or she might enter the following search keywords on the web page: "Nokia mobile phone that can be used by an elderly person" or "multifunctional mobile phone to be used by elderly person, Nokia." The searched web page information may sell computers and Nokia display devices suited for elderly people and other such web page information that is related to the user's search keywords, but not all such items are necessarily mobile phones suited for elderly people, which are what the user actually wishes to purchase. It is desirable to first extract only the core product words included in the search query and use the core product words associated with the search query to determine a similarity value with a set of web page information. For example, to obtain the core product words of the search query, a general part-of-speech tagging tool may be used to obtain the parts of speech (noun, verb, adjective, etc.) of each search keyword in the search query. The set of one or more nouns extracted from the search query become the core product words. It is presumed that the search query includes at least one noun. If the search query includes just one noun, then the noun is the core product word. If the search query includes two nouns A and B, then the relationship between A and B is evaluated. If there is a high probability that noun A modifies noun B, then noun B is the core product word. In the reverse situation, noun A would be the core product word. If the difference between the probabilities is very low or if the two nouns are very similar, then the two are both core product words. If the search query includes three or more nouns, then the last noun C is regarded as a core product word, and the relationship of the preceding two nouns to C is evaluated (similar to situations where only two nouns are included, as described previously) to determine whether either or both of the two nouns are core product words.

One or more core product words associated with the set of web page information are extracted from (e.g., the value of a particular field such as the products word field of) the set of web page information. Core product words of the set of web page information may be determined using the same example technique as described above for the search query.

After core product words have been determined for the search query and the set of web page information, the click rate in various categories is determined for each of the set of core product words extracted from the search query and each set of core product words extracted from a set of web page information. A click rate category distribution is determined for each set of core product words extracted from a set of web page information. For example, the click rate category distribution associated with the set of core product words associated with the set of web page information may include categories that have been included in historical sets of web page information that have included the same set of product words. A click rate category distribution is determined for each set of core product words associated with the search query. For example, the click rate category distribution associated with the set of core product words associated with the search query may include the categories associated with the set of web page information that have been selected among search results historically returned for search queries that included the set of core product words. A click rate category distribution may include a statistical representation for each different category.

Given that the click rate category distribution has been determined for each of the set of core product words associated with the search query and the set of core product words associated with the set of web page information, the similarity value between the search query and the set of web page information may be determined using the example formula, formula (1), below:

$$D(Q_p, D_p) = \Sigma_w p_Q(w) \cdot \log \frac{p_Q(w)}{p_D(w)} \quad (1)$$

In formula 1, $D(Q_p, D_p)$ represents the similarity value between a set of web page information and a search query, $Q_p$ represents the click rate category distribution of the core product words of the search query, $D_p$ represents the click rate category distribution of core product words in the set of web page information, w represents the maximum number of different categories in the click rate category distribution associated with the search query and the click rate category distribution associated with the set of web page information, $p_Q(w)$ represents the click rate for category w of the search query, and $p_D(w)$ represents the click rate for category w of the core products words in the particular set of web page information.

Then the similarity value (e.g., $D(Q_p, D_p)$) is compared against a preset similarity threshold value. In some embodiments, if the similarity value is less than the preset similarity threshold value, then the set of web page information associated with the similarity value is filtered out (e.g., excluded from further processing). In some embodiments, if the similarity value is equal to or greater than the preset similarity threshold value, then the set of web page information associated with the similarity value is retained (e.g., included in further processing)

At 308, the plurality of sets of web page information is sorted into one or more groups based on vendors associated with respective ones of the plurality of sets of web page information. The preliminary matching sets of web page information that were not filtered out at 306 are sorted into various groups, where sets of web page information in the same group are associated with the same vendor. Put another way, the sets of web page information that are submitted by the same vendor are sorted into the same group.

At 310, for a group of sets of web page information associated with a vendor, a value included in the group of sets of web page information is determined as an attribute value of a main product attribute associated with the vendor. For example, 310 may be performed in a manner similar to 208 of process 200 of FIG. 2. As described above for 208 of process 200 of FIG. 2, a value from a second designated field of the sets of web page information in a group associated with a vendor may be used to determine a main industry attribute associated with the vendor.

At 312, a set of web page information of the group of sets of web page information is determined to be included in search results based at least in part on the search query corresponding to the attribute value of the main product attribute associated with the vendor. For example, 312 may be performed in a manner similar to 210 of process 200 of FIG. 2. As described above for 210 of process 200 of FIG. 2, a set of web page information is determined to be included in search results if at least one of the main product attribute value associated with its vendor or the main industry attribute value associated with its vendor corresponds to a search keyword of the search query. Also, a set of web page information is determined to be excluded from the search results if neither the main product attribute value associated with its vendor nor the main industry attribute value associated with its vendor corresponds to a search keyword of the search query.

At 314, the search results are ranked. In some embodiments, the sets of web page information determined to be included at 312 in search results are optionally ranked prior to being displayed to the user.

The search results may be ranked based on any appropriate technique. One example ranking technique is described as follows:

One or more characteristics of the search query are determined. For example, characteristics may include location information associated with a client device from which the search query was received. Also, a click probability forecasting model is determined. The click probability forecasting model comprises predicted click rate probabilities corresponding to the sets of web page information and for different characteristic information associated with search queries. For example, the predicted click rate probabilities may be based on historical information such as recorded search keywords from historical searches, previously displayed search results and their respective positions on the search results page, and the sets of web page information that have been selected by the user among historical search results. Furthermore, the characteristics information associated with search keywords with respect to the sets of web page information that have been selected by the user (e.g., information such as the locations associated with popular or hit search keywords and the correlations of the search keywords to web page information) are determined from these historical searches. For example, machine learning methods (such as a logical regression model, for example) may be used on such historical data to determine the characteristics information and training is conducted to determine what kind of click rate can be obtained for which characteristics associated with a search query with respect to each set of web page information that has previously been displayed at a search results page. For example, training on the statistical models may be able to obtain a predicted click rate for a set of characteristics associated with the search query for each set of web page information that has historically been displayed in a search results page. Therefore, a click probability forecasting model is established in some embodiments, and this model includes statistical information on predicted click rate probabilities corresponding to different characteristic information. When a new search query (i.e., a search query for which characteristic information has not been previously determined) is received, calculations are performed in real-time on the relationship between the sets of web page information that are included in the search results and the search keywords included in the search query and the previously generated click probabilities are retrieved for the new search query with respect to the sets of web page information. In some embodiments, the sets of web page information may be ranked based on their respective predicted click rate probabilities for the characteristic information of the current search query.

Sometimes, a set of web page information comprises an advertisement. When advertisements are served on a search results page, a vendor may bid on a search keyword such that when the search keyword is included in a search query, a set of web page information (e.g., an advertisement) associated with the vendor has a greater likelihood of being displayed on the search results page. As such, the bid prices associated with various search keywords may be stored in a database. In some embodiments, such as when the sets of web page information to be ranked comprise advertisements, a ranking value is determined for each set of web page information based on the predicted click rate probabilities, characteristic information of the current search query, and the bid prices associated with the search keywords of the current search query. For example, the ranking value for each set of web page information may be determined as the product between its respective predicted click rate probability for the characteristic information of the current search query and a bid price associated with the current search query. For example, if the search query includes one search keyword, then the bid price associated with the search query is the bid price of the search keyword. Or if the search query includes multiple search keywords, then the bid price associated with the search query is the highest bid price associated with any of the search keywords. Then the search results are ranked in descending order of their respective ranking values.

In some embodiments, once the search results are ranked, at least a portion of the highest ranking search results are returned to be displayed for the user.

At 316, the set of web page information of the group of sets of web page information is updated using the main product attribute. Optionally, in some embodiments, the sets of web page information associated with a group for which a main product attribute has been determined may be updated with the determined main product attribute. For example, because at least some of the information included in a set of web page information is voluntarily submitted by an associated vendor, the set of web page information may not include the core product words in the value of the main product attribute that were determined for that vendor by the system. Therefore, product words that are associated with the main product attribute that are not included in the set of web page information may be added to the set of web page information and product words that are not associated with the main product attribute but are included in the set of web page information may be deleted from the set of web page information. To give an example, assume that the value for the product words field that the vendor submitted for set of web page information A are "mobile phones, MP3s, computers, and telephones." Then the sets of web page information associated with the vendor are found, including set of web page information A mentioned above. The main product attribute value determined (e.g., based on a process such as process 200 of FIG. 2) for the vendor is just "MP3, tablets." Therefore, set of web page information A may be updated to exclude "computers," "telephones," and "mobile phones" and to add "tablets," based on the main product attribute value. The updated product words field of the set of web page information A includes "MP3s, tablets." The updated product words fields of the sets of web page information better reflect the primary products that are sold by the vendor. Also, such automatic updating of the sets of web page information may help vendors who have forgotten to update information that they have previously submitted.

Optionally, in some embodiments, the sets of web page information associated with a group for which a main industry attribute has been determined may be updated with the determined main industry attribute. For example, because at least some of the information included in a set of web page information is voluntarily submitted by an associated vendor, the set of web page information may not include the industries in the value of the main industry attribute that was determined for that vendor. Therefore, industries that are associated with the main industry attribute that are not included in the set of web page information may be added to the set of web page information and industries that are not associated with the main industry attribute but are included in the set of web page information may be deleted from the set of web page information. The updated industry fields of the sets of web page information better reflect the primary industries associated with the vendor.

Regarding the described embodiments of processes, for the sake of simplicity, all have been presented as combinations of a series of actions. However, persons skilled in the art should be aware that the present application is not limited by the sequence of actions described, for certain steps may be executed in other sequences or simultaneously with other steps within the spirit of the present application.

Figure 4:
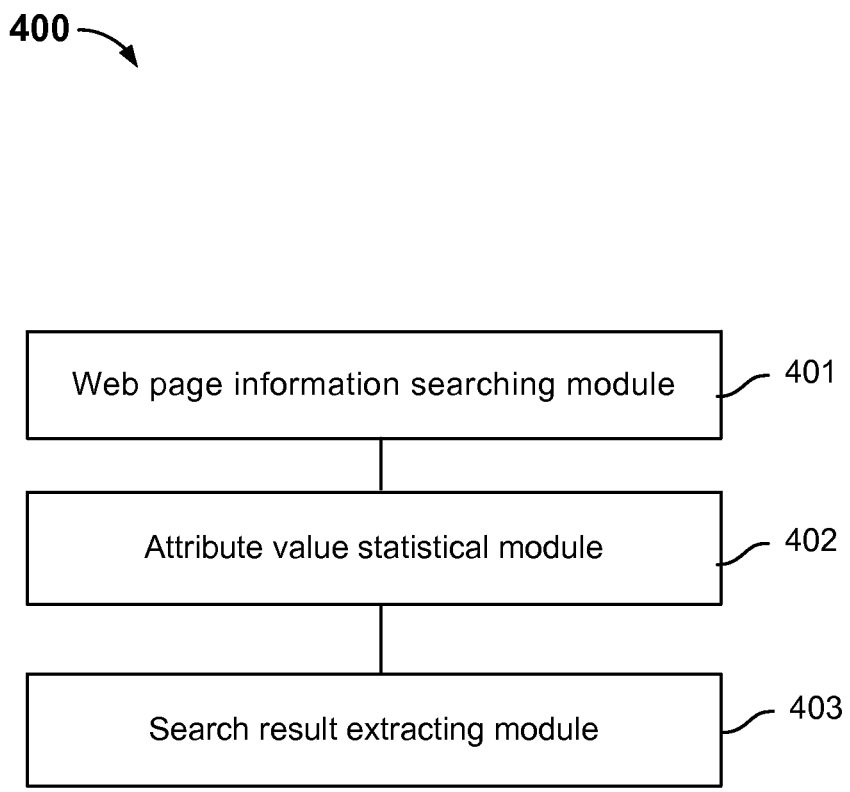
FIG. 4 is a diagram showing an embodiment of a system for generating search results.

FIG. 4 is a diagram showing an embodiment of a system for generating search results. In the example, system 400 includes: web page information module 401, attribute value statistical module 402, and search result extracting module 403. In some embodiments, process 200 of FIG. 2 is implemented on system 400.

The modules and sub-modules can be implemented as software components executing on one or more processors, as hardware such as programmable logic devices and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and sub-modules may be implemented on a single device or distributed across multiple devices.

Web page information module 401 is configured to use search keywords as a basis for searching for corresponding sets of web page information.

Attribute value statistical module 402 is configured to sort a plurality of sets of web page information into groups based on associated vendors. Attribute value statistical module 402 is also configured to extract a first designated field and/or a second designated field's value whose percentage of occurrence is greater than a preset threshold value from among the web page information associated with a particular vendor. For example, the first designated field is the product words field and the second designated field is the associated industry field. The core product words of the extracted first designated field value are used as the attribute value of the main product attribute value for the vendor. Also, the industry value(s) included in the second designated field value are used as the attribute value of the main industry attribute value for the vendor.

Search result extracting module 403 is configured to determine sets of web page information associated with main product attributes and/or main industry attributes that correspond to the search query to include in search results.

In some embodiments, attribute value statistical 402 may include:

A web page information extracting sub-module configured to sort the sets of web page information based on various associated vendors.

A percentage calculating sub-module configured to extract the values of the product words fields and/or the value of the associated industries fields from a group of sets of is web page information. The percentage calculating sub-module is also configured to determine the percentage of occurrence among the group for each different value of the product words fields and determine which values are associated with percentages of occurrence that exceed a first preset threshold value. The percentage calculating sub-module is also configured to determine the percentage of occurrence among the group for each different value of the associated industry fields and determine which values are associated with percentages of occurrence that exceed a second preset threshold value.

An attribute value extracting sub-module configured to extract the core product words from those product words field values whose associated percentages are greater than the first preset threshold value and use them as attribute value(s) corresponding to the main product attribute associated with the vendor. The attribute value extracting sub-module is also configured to use the associated industries values whose percentage is greater than the second preset threshold value as the attribute value(s) corresponding to the main industry attribute associated with the vendor.

Figure 5:
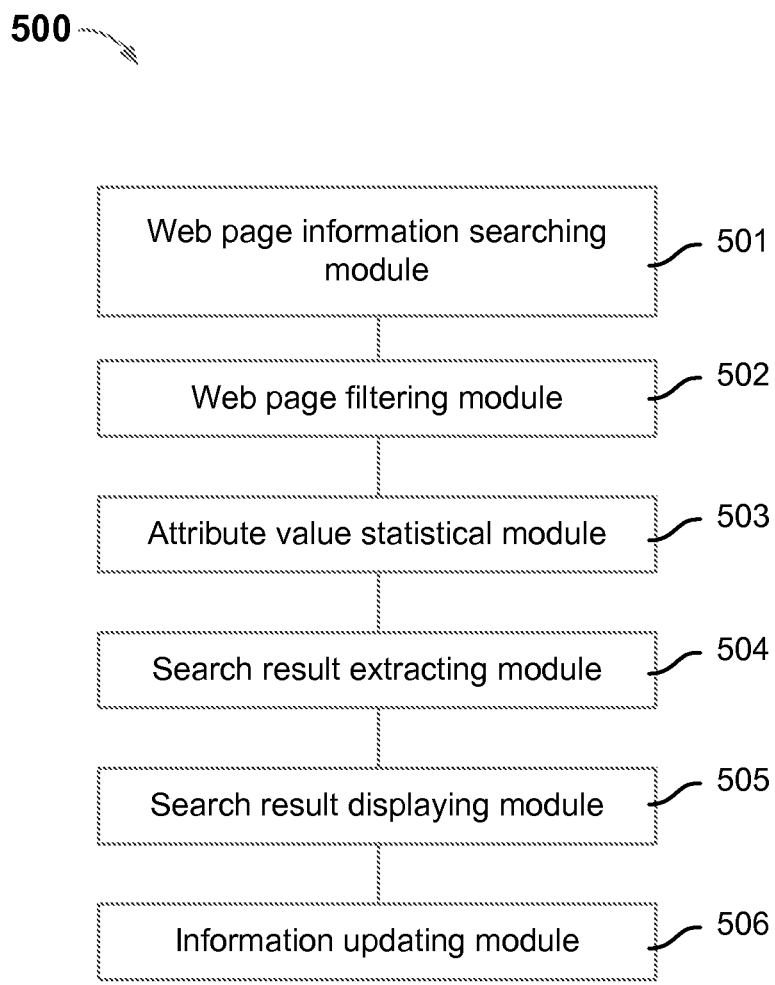
FIG. 5 is a diagram showing an embodiment of a system for generating search results.

FIG. 5 is a diagram showing an embodiment of a system for generating search results. In the example, system 500 includes: web page information searching module 501, web page filtering module 502, attribute value statistical module 503, search result extracting module 504, search result displaying module 505, and information updating module 506. In some embodiments, process 300 is implemented on system 500.

Web page information searching module 501, for using user-entered search keywords as a basis for searching for corresponding web page information.

Web page filtering module 502 is configured to filter out sets of web page information whose associated similarity values with respect to the search keywords are less than a preset similarity threshold value.

In some embodiments, the similarity value of a set of web page information with respect to the search keywords is determined using the sub-modules described below:

A core product word extracting sub-module configured to individually extract the core product words from the sets of web page information and from the search keywords.

A similarity calculating sub-module configured to calculate the similarity value of each set of web page information with respect to the search keywords using the click rate of each core product word in different click categories.

Attribute value statistical module 503 configured to sort a plurality of sets of web page information into groups based on associated vendors. Attribute value statistical module 503 is also configured to extract a first designated field and/or a second designated field's value whose percentage of occurrence is greater than a preset threshold value from among the web page information associated with a particular vendor. For example, the first designated field is the product words field and the second designated field is the associated industry field. The core product words of the extracted first designated field value are used as the attribute value of the main product attribute value for the vendor. Also, the industry value(s) included in the second designated field value are used as the attribute value of the main industry attribute value for the vendor.

Search result extracting module 504 is configured to determine sets of web page information associated with main product attributes and/or main industry attributes that correspond to the search query to include in search results.

In some embodiments, the search results may be ranked.

Search result displaying module 505 is configured to display the search results on a search results page for the user.

In some embodiments, at least some of the vendors comprise advertisers, and search result displaying module 505 may include:

Characteristic information statistical sub-module configured to separately compile statistical information on the characteristic information of the search keywords and associated with various sets of web page information.

Click probability forecasting sub-module is configured to use the characteristic information and a click probability forecasting model to determine the predicted click probabilities for the various sets of web page information. The click probability forecasting is model comprises the statistical information of predicted click probabilities of various sets of web page information corresponding to different characteristic information associated with historical search queries.

Selling lead ranking sub-module is configured to rank the various sets of web page information based on their respective the predicted click probabilities, characteristic information of the current search query, and search keyword bid prices.

In some embodiments, the obtained main product attributes and main industry attributes associated with various vendors may be used to update the sets of web page information associated with the vendors. In some embodiments, system 500 further includes:

Information updating module 506 is configured to use the main product attribute and main industry attribute of each vendor as a basis for updating the sets of web page information associated with the vendor.

The present application can be used in many general purpose or specialized computer system environments or configurations. For example: personal computers, servers, handheld devices or portable equipment, tablet type equipment, multiprocessor systems, microprocessor-based systems, set-top boxes, programmable consumer electronic equipment, networked PCs, minicomputers, mainframe computers, distributed computing environments that include any of the systems or equipment above, and so forth.

The present application can be described in the general context of computer executable commands executed by a computer, such as a program module. Generally, program modules include routines, programs, objects, components, data structures, etc. to execute specific tasks or achieve specific abstract data types. The present application can also be carried out in distributed computing environments; in such distributed computing environments, tasks are executed by remote processing equipment connected via communication networks. In distributed computing environments, program modules can be located on storage media at local or remote computers that include storage equipment.

A search result generation method and a search result generation device offered by the present application have been described in detail above. This document has employed specific embodiments to expound the principles and forms of implementation of the present application. The above embodiment explanations are only meant to aid in comprehension of the methods of the present application and of its core concepts. Moreover, a person with general skill in the art would, on the basis of the concepts of the present application, be able to make modifications to specific implementations and to the scope of applications. To summarize the above, the contents of this description should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
   determine a preliminary plurality of sets of web page information that match at least one keyword of a search query;
   prior to causing a search result to be presented in response to the search query:
      sort the preliminary plurality of sets of web page information into one or more groups based on vendors associated with respective ones of the preliminary plurality of sets of web page information;
      for each group of sets of web page information associated with a vendor, determine a value included in that group of sets of web page information as an attribute value of an attribute associated with the vendor including to:
      extract values associated with product words fields from that group of sets of web page information;
      determine a first percentage of occurrence for a first unique value of the extracted values;
      determine a second percentage of occurrence for a second unique value of the extracted values;
      determine that the first unique value is the attribute value of the attribute associated with the vendor based at least in part on the first percentage of occurrence associated with the first unique value being equal to or exceeding a first preset threshold value; and
      determine that the second unique value is not the attribute value of the attribute associated with the vendor based at least in part on the second percentage of occurrence associated with the second unique value being less than the first preset threshold value; and
      select a group of sets of web page information associated with the vendor of the preliminary plurality of sets of web page information to be included in search results to be presented based at least in part on the search query corresponding to the attribute value of the attribute associated with the vendor; and
   cause at least a portion of the search results to be presented, wherein the search results include the group of sets of web page information associated with the vendor; and
one or more memories coupled to the one or more processors and configured to provide the one or more processors with instructions.

2. The system of claim 1, wherein the attribute comprises a main product attribute.

3. The system of claim 1, wherein the attribute associated with the vendor comprises a first attribute associated with the vendor, and wherein the one or more processors are further configured to:
   for that group of sets of web page information associated with the vendor, determine another value included in the group of sets of web page information as an attribute value of a second attribute associated with the vendor.

4. The system of claim 3, wherein the second attribute comprises a main industry attribute.

5. The system of claim 3, wherein to determine the other value included in the group of sets of web page information includes to:
   extract values associated with associated industry fields from the group of sets of web page information;
   determine a third percentage of occurrence for a third unique value of the extracted values; and
   determine that the third unique value as an attribute value of the second attribute associated with the vendor based at least in part on the third percentage of occurrence associated with the third unique value being equal to or exceeding a second preset threshold value.

6. The system of claim 5, wherein to determine the group of sets of web page information associated with the vendor is to be included in search results is further based at least in part on the search query corresponding to the attribute value of the second attribute associated with the vendor.

7. The system of claim 1, wherein the vendor comprises a first vendor, and wherein the one or more processors are further configured to determine that a group of sets of web page information associated with a second vendor is to be excluded from the search results based at least in part on the search query not corresponding to an attribute value of the attribute associated with the second vendor.

8. The system of claim 1, wherein the one or more processors are further configured to determine whether to filter out a first set of web page information from the plurality of sets of web page information based on a similarity between the first set of web page information and the search query.

9. The system of claim 1, wherein the one or more processors are further configured to rank search results.

10. The system of claim 1, wherein at least some of the plurality of sets of web page information comprises sets of product information.

11. The system of claim 1, wherein the plurality of sets of web page information was determined to match the search query.

12. A method, comprising:
determining a preliminary plurality of sets of web page information that match at least one keyword of a search query;
prior to causing a search result to be presented in response to the search query:
   sorting, using one or more processors, the preliminary plurality of sets of web page information into one or more groups based on vendors associated with respective ones of the preliminary plurality of sets of web page information;
   for each group of sets of web page information associated with a vendor, determining a value included in that group of sets of web page information as an attribute value of an attribute associated with the vendor including by:

extracting values associated with product words fields from that group of sets of web page information;

determining a first percentage of occurrence for a first unique value of the extracted values;

determining a second percentage of occurrence for a second unique value of the extracted values;

determining that the first unique value is the attribute value of the attribute associated with the vendor based at least in part on the first percentage of occurrence associated with the first unique value being equal to or exceeding a first preset threshold value; and determining that the second unique value is not the attribute value of the attribute associated with the vendor based at least in part on the second percentage of occurrence associated with the second unique value being less than the first preset threshold value; and selecting a group of sets of web page information associated with the vendor of the preliminary plurality of sets of web page information to be included in search results to be presented based at least in part on the search query corresponding to the attribute value of the attribute associated with the vendor; and causing at least a portion of the search results to be presented, wherein the search results include the group of sets of web page information associated with the vendor.

13. The method of claim 12, wherein the attribute comprises a main product attribute.

14. The method of claim 12, wherein the attribute associated with the vendor comprises a first attribute associated with the vendor, and further comprising:

for the group of sets of web page information associated with the vendor, determining another value included in the group of sets of web page information as an attribute value of a second attribute associated with the vendor.

15. The method of claim 14, wherein the second attribute comprises a main industry attribute.

16. The method of claim 14, wherein determining the other value included in the group of sets of web page information includes:

extracting values associated with associated industry fields from the group of sets of web page information;

determining a third percentage of occurrence for a third unique value of the extracted values; and determining that the third unique value as an attribute value of the second attribute associated with the vendor based at least in part on the third percentage of occurrence associated with the third unique value being equal to or exceeding a second preset threshold value.

17. A computer program product, the computer program product being embodied in a non-transitory computer readable storage medium and comprising computer instructions for:

determining a preliminary plurality of sets of web page information that match at least one keyword of a search query;

prior to causing a search result to be presented in response to the search query:

sorting the preliminary plurality of sets of web page information into one or more groups based on vendors associated with respective ones of the preliminary plurality of sets of web page information;

for each group of sets of web page information associated with a vendor, determining a value included in that group of sets of web page information as an attribute value of an attribute associated with the vendor including by:

extracting values associated with product words fields from that group of sets of web page information;

determining a first percentage of occurrence for a unique value of the extracted values;

determining a second percentage of occurrence for a second unique value of the extracted values;

determining that the first unique value is the attribute value of the attribute associated with the vendor based at least in part on the first percentage of occurrence associated with the first unique value being equal to or exceeding a first preset threshold value; and determining that the second unique value is not the attribute value of the attribute associated with the vendor based at least in part on the second percentage of occurrence associated with the second unique value being less than the first preset threshold value; and selecting a group of sets of web page information associated with the vendor of the preliminary plurality of sets of web page information to be included in search results to be presented based at least in part on the search query corresponding to the attribute value of the attribute associated with the vendor; and causing at least a portion of the search results to be presented, wherein the search results include the group of sets of web page information associated with the vendor.

* * * * *